United States Patent [19]
Munro

[11] Patent Number: 6,140,399
[45] Date of Patent: Oct. 31, 2000

[54] POLYMER COMPOSITIONS

[75] Inventor: Sheila Munro, Stretford Manchester, United Kingdom

[73] Assignee: Great Lakes Chemical (Europe) GmbH, Frauenfeld, Switzerland

[21] Appl. No.: 09/243,769

[22] Filed: Feb. 3, 1999

[30] Foreign Application Priority Data

Feb. 3, 1998 [GB] United Kingdom .................. 9802181

[51] Int. Cl.⁷ ...................................... C08K 3/32
[52] U.S. Cl. .................. 524/127; 524/141; 524/142; 524/143; 525/68; 558/211; 252/606
[58] Field of Search ..................... 524/141, 142, 524/143, 127; 558/211; 252/606; 525/68

[56] References Cited

U.S. PATENT DOCUMENTS

| | | | |
|---|---|---|---|
| 3,862,998 | 1/1975 | Koehler et al. | 525/147 |
| 5,206,404 | 4/1993 | Gunkel et al. | 558/146 |
| 5,455,292 | 10/1995 | Kakegawa et al. | 524/141 |

FOREIGN PATENT DOCUMENTS

| | | |
|---|---|---|
| 324716A | 7/1989 | European Pat. Off. . |
| 0 573 082 A2 | 12/1993 | European Pat. Off. . |
| 0 573 082 A3 | 12/1993 | European Pat. Off. . |
| 0 611 798 A1 | 8/1994 | European Pat. Off. . |
| 2 330 583 | 4/1999 | United Kingdom . |
| WO 96/05208 | 2/1996 | WIPO . |

*Primary Examiner*—Robert Dawson
*Assistant Examiner*—Kuo-Liang Peng
*Attorney, Agent, or Firm*—Woodard, Emhardt, Naughton, Moriarty & McNett

[57] ABSTRACT

The invention relates to a polymeric composition comprising at least one engineering polymer and at least one phosphate ester flame retardant additive which is characterized in that the phosphate ester is a mixed tri (tertiary butylphenyl) phosphate ester which comprises from 1 to 45% by weight of tri (tertiary butylphenyl) phosphate; from 10 to 55% by weight of di tertiary butylphenyl mono phenyl phosphate; from 10 to 60% by weight of mono tertiary butylphenyl diphenyl phosphate and less than 10% by weight of triphenyl phosphate.

25 Claims, No Drawings

POLYMER COMPOSITIONS

This invention relates to polymer compositions comprising a flame retardant additive which exhibits improved properties when formed by a moulding process. This invention additionally provides a method of producing polymeric compositions having improved properties which comprises incorporating a particular group of flame retardants into those compositions.

Engineering polymers may be defined as plastics that serve engineering purposes and which can be processed and reprocessed by injection and extrusion methods. In use such polymers commonly comprise a flame retardant additive, the presence of which is required to meet the specifications of many applications. One class of flame retardant additives is monophosphate esters such as triphenyl phosphate, tricresyl phosphate, diphenyl cresyl phosphate, diphenyl octyl phosphate, diphenyl 2-ethyl hexyl phosphate, tri (isopropylphenyl) phosphate, tributyl phosphate, tris (2chloroethyl) phosphate and tris (2,3-dibromopropyl) phosphate. EPA 206058 describes the use of such phosphorus compounds as flame retardants in polycarbonate resin compositions including copolymers of styrenes and maleic anhydrides. EPA 207359 describes the use of such phosphorus compounds as flame retardants in compositions consisting of polycarbonates, polystyrenes and optionally copolymers of styrene and acrylonitrile. EPA 345522 describes the use of such phosphorus compounds as flame retardants in compositions consisting of polycarbonates, copolymers of styrene, acrylonitrile and butadiene, and optionally copolymers of styrene and acrylonitrile.

One disadvantage which may be manifest in the injection moulding of polymer compositions comprising these phosphates is a phenomenon known as "juicing" a term which refers to the tendency of the phosphate flame retardant to volatilise out of the molten polymer during injection moulding. The volatile components then condense on the mould surface leaving deposits on the surface. These deposits are then transferred to subsequent mouldings. Juicing thus makes the moulds more difficult to clean and the deposits transferred to subsequent mouldings can induce stress cracking in the polymer. Stress cracking manifests itself in the form of crazing of the polymer surface and ultimately breakage of the moulded parts at those areas where there is a stress concentration in the mould design. EPA 363608 describes the use of certain bis phosphates (phosphates derived from dihydric phenols) as flame retardants in polycarbonate resin compositions. The bis phosphates are stated to offer improved performance as flame retardants and a reduced tendency to juicing compared to the conventional monophosphates. Although the use of bis phosphates generally results in a reduced tendency to juicing, some bis phosphates can suffer with reduced humid ageing performance compared with many mono phosphates.

We have now discovered a particular group of monophosphates which are useful as flame retardants in engineering polymers and which are superior in performance to the known monophosphates in terms of their tendency to juice out from the polymer and subsequently cause stress cracking in a moulded workpiece. The group of phosphates which have been discovered to be useful in the compositions of this invention are mixed tri (tertiary butyl phenyl) phosphates which mixture comprises from 1 to 45% of tri (tertiary butylphenyl) phosphate; from 10 to 55% by weight of di (tertiary butylphenyl) monophenyl phosphate; from 15 to 60% by weight of mono (tertiary butylphenyl) diphenyl phosphate and less than 10% by weight of triphenyl phosphate. Mixed phosphate esters of this general type are articles of commerce which are produced by the alkylation of phenol with isobutylene to produce a mixture of alkyl phenols and phenol which is then phosphorylated to produce the mixed phosphate ester. The mixed phosphate esters useful in the compositions of this invention may be produced using the processes described in our European Patent 573082. They may also be produced by the processes described in our United Kingdom Patent Application 9722719.3. United Kingdom Patent Application 9722719.3 discloses the use of Bronsted acids having an acid strength of less than zero and preferably less than minus 8 to catalyse the alkylation of phenol with olefins comprising from 2 to 12 carbon atoms and in particular with isobutylene and the subsequent phosphorylation of the alkylated phenol to produce a mixed phosphate ester.

The preferred mixed (tertiary butylphenyl) phosphate esters for use in the compositions of this invention comprise form 25 to 45% by weight of tri (tertiary butylphenyl) phosphate; from 30 to 55% by weight of di (tertiary butylphenyl) mono phenyl phosphate; from 10 to 25% by weight of mono (tertiary butylphenyl) diphenyl phosphate and less than 5% by weight of triphenyl phosphate. In the most preferred embodiments the phosphate will comprise less than 2% by weight of triphenyl phosphate.

Examples of commercially available polymers in which the invention finds particular application include polycarbonates, polycarbonate/ABS blends, polycarbonate/SAN blends, polycarbonate/SMA blends, all combinations of the various tyrenic co/terpolymers with polycarbonate and polyphenylene oxide/high impact polystyrene blends.

The amount of phosphate flame retardant incorporated into the polymer may vary within a wide range depending in particular upon the degree of flame retardance required and the amount, if any, of auxiliary flame retardant which may be incorporated with the phosphate. In general the composition will comprise from 1 to 35 parts by weight and preferably from 5 to 20 parts by weight, based on 100 parts by weight of the polymer, of the mixed tri (tertiary butylphenyl) phosphate as defined above.

In a preferred embodiment the mixed tri (tertiary butyl phenyl) phosphate may be used in combination with an oligomeric phosphate. Oligomeric phosphates useful in this embodiment include those having the formula:

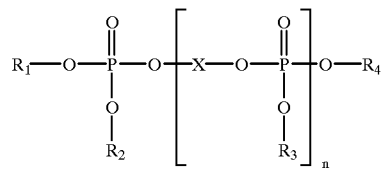

wherein the groups $R_1$, $R_2$, $R_3$ and $R_4$ which may be the same or different represent aryl groups, halo-substituted aryl groups or alkyl substituted aryl groups wherein the alkyl substituent comprises from 2 to 6 carbon atoms, X represents an arylene group and n is an integer having a value from 1 to 5.

These oligomeric phosphates may be used as discrete compounds but more usually they are manufactured and used in the form of a mixture of compounds having the above formula wherein n has an average value of at least 1. The integer n usually has an average value of no greater than 2.

The preferred oligomeric phosphates for use in the compositions of this invention are those compounds having the formula 1 wherein X represents a phenylene group or those compounds wherein X represents a 2,2 diphenylpropane group, a methylene group, or a group —SO$_2$—. The former group are those derived from dihydric phenols such as catechol, resorcinol or hydroquinone whilst the latter are those derived from bisphenol A, bisphenol F or bisphenol S. The most preferred oligomeric compounds for use in this invention are those mixed oliomeric phosphates derived from resorcinol or from bisphenol A.

These "oligomeric" phosphate mixtures may comprise compounds having the above formula but wherein n has a value of zero. Where the groups R represent phenyl groups such a compound is triphenyl phosphate. In such a case the amount of oligomeric phosphate which is used should be controlled so as to maintain the total level of triphenyl phosphate below the maximum and preferably within the preferred limits described above.

The polycarbonate based blends useful in the composition of this invention may be based upon any of the known polycarbonate resins. These known resins are manufactured on a large scale by the reaction of an aromatic diol with, for example, phosgene or by transesterification of a bisphenol with a monomeric carbonate. They comprise units of the formula —(—O—A—O—C—)— wherein A is the bivalent aromatic radical derived from the aromatic diol. Suitable aromatic diols are those having the formula:

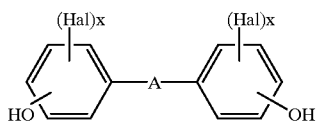

wherein A represents a single bond, a $C_1$ to $C_5$ alkylene group; a $C_2$ to $C_5$ alkylidene group, a $C_5$ to $C_6$ cycloalkylidine group, a group —S—, or a group —SO$_2$—, Hal represents a chlorine or a bromine atom and X is zero or an integer having a value of 1 or 2 or those having the formula

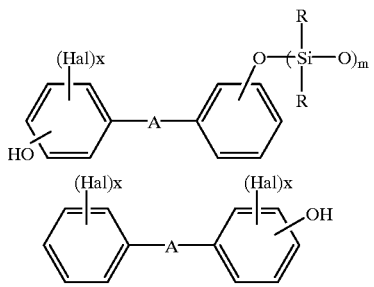

wherein Hal, A and X have the meanings given above, R represents an alkyl or aryl group comprising from 1 to 20 carbon atoms and m is an integer having a value of from 5 to 100

Examples of aromatic diols useful in the production of polycarbonates include hydroquinone, resorcinol, 4,4'dihydroxydiphenyl; 2,2, bis (4 hydroxyphenyl) propane; 2,4 bis (4 hydroxyphenyl) 2-methylbutane; 1,1 bis (4 hydroxyphenyl) propane; 2,2 bis (3,5 dichloro-4-hydroxyphenyl)-propane and 2,2 bis (3,5 dibromo-4-hydroxyphenyl) propane.

The polycarbonates may also be branched in a known manner for example by the incorporation of from 0.05 to 2.0 mole % based on the sum of the aromatic diols employed of a trihydric phenol or a phenol which is more than trihydric.

Copolycarbonates are also useful in the compositions of this invention. Copolycarbonates derived from bis phenol A in admixture with other aromatic diols especially 2,2 bis (3,5 dibromo-4-hydroxyphenyl)-propane are especially useful.

The polycarbonates suitable for use in accordance with this invention have average molecular weights of from 10,000 to 200,000.

These polycarbonate resins are commonly used in blends with various styrenic polymers and copolymers including graft copolymers with rubbers. The rubbers used to produce the graft polymers include polybutadiene, butadiene/styrene copolymers, poyisoprenes, alkyl acrylate rubbers, EPDM rubbers i.e. rubbers of ethylene, propylene and an unconjugated diene, and also silicone rubbers. The preferred rubbers used in the production of the graft polymer are diene and alkyl acrylate rubbers. The particularly preferred graft polymers are the so called ABS polymers. The polymer blends used in the compositions of in this invention include polycarbonate/styrene acrylonitrile copolymer (SAN) blends, polycarbonate/styrene maleic anhydride copolymer (SMA) blends, polycarbonate/acrylonitrile butadiene styrene (ABS) terpolymer blends and more complex blends of polycarbonate with any mix of the styrenic based coterpolymers. The polymer blends used in the compositions of this invention are preferably free or substantially free from halogen atoms.

The preferred polymer composition is based on a blend of polycarbonate with the ABS type graft polymers. These graft copolymers vary widely in the compositions and properties. The amount which is blended with a particular polycarbonate will vary with the nature of the polycarbonate, the nature of the ABS copolymer and the use for which the blend is intended. In general these PC/ABS blends comprise from 3 to 40% preferably from 4 to 25% of ABS (based on the total weight of the polymer blend).

A second group of blends useful in the composition of this invention are the PC/SAN blends. SAN polymers are styrene acrylonitrile copolymers which may be produced by radical polymerisation of the appropriate monomers. Such copolymers are articles of commerce which may be produced by conventional techniques such as emulsion, suspension, solution or bulk polymerisation. Preferred copolymers are those of styrene and/or α-methyl styrene with acrylonitrile and optionally with methyl methacrylate. These SAN copolymers preferably have weight average molecular weights in the range 15,000 to 200,000. In general these PC/SAN blends comprise from 3 to 40%, preferably from 4 to 25% of SAN, based on the total weight of the polymer blend.

A third group of blends useful in the compositions of this invention are the polycarbonate/styrene maleic anhydride (SMA) copolymer blends. SMA copolymers comprising 70 to 95% of a styrenic monomer especially styrene, α-methyl styrene, alkyl substituted styrenes or mixtures thereof and from 5 to 30% by weight of maleic anhydride are well known in the art. In general these PC/SMA blends comprise from 3 to 40%, preferably from 4 to 25% of SMA, based on the total weight of the polymer blend.

Another engineering polymer blend useful in the compositions of this invention are the PPO (polyphenylene oxide) blends with high impact polystyrene. These polymers are commercially available and are sold for example under the Trade Mark Noryl as supplied by GE Plastics.

The polymer compositions may additionally require the use of antidrip agents in order to meet certain flammability tests which specify that no burning material can fall from the sample during the flammability test. These antidrip agents are commonly tetrafluoroethylene polymers such as Teflon 6C or Teflon 30N and are used at loadings of 0.05 to 5 parts by weight, based on the total weight of the polymer blend. (Teflon is a Trade Mark of the Du Pont Corporation).

In order to achieve the optimum mix of flame retardancy, physical properties, stress crack resistance and cost it is common to use mixed phosphate ester systems. The tertiary butylated phenyl phosphate mixtures can be used in compositions with monophosphates (other than the tertiary butylphenyl phosphate) such as triphenyl phosphate or with bisphosphates of the type described above especially with resorcinol diphenyl phosphate or bis-phenol A diphenyl phosphate or with oligomeric phosphate mixtures comprising these bis-phosphates such as that sold under the Trade Mark Reofos RDP, to give the desired combination of properties without sacrificing the improvement in stress crack resistance of the formulations. A portion of the tertiary butylphenyl phosphate may be replaced with from 1% w/w to 50% w/w of bisphosphates and/or 1% w/w to 10% w/w of monophosphates in order to produce a balance between the properties and cost of the composition.

The compositions of this invention may also comprise a variety of conventional ingredients. In particular the flame retardant properties may be enhanced by the addition of other known flame retardants such as other phosphorus compounds, sodium trichloro benzene sulphonate, salts of sulphone sulphonates such as the potassium salt of diphenyl sulphone sulphonate, salts of perfluorinated alkane sulphonic acid, sodium aluminium hexafluoride, and the like. These conventional flame retardant agents may be used to replace a portion of the phosphate or they may be used in addition to the phosphate in order to further enhance the flame retardant properties of the composition.

The compositions may also comprise other conventional additives such as fillers, reinforcing fibres, stabilisers, pigments and dyes, plasticisers, mould release agents and antistatically active agents.

The compositions of this invention may be produced using conventional compounding techniques for example compounding the ingredients in an extruder utilising liquid or solid feed systems depending on the nature of the additives at normal processing temperatures.

The evaluation of stress cracking performance was measured by painting a thin layer (1 to 2 drops) of the liquid phosphorus compound onto the centre section of a tensile test bar fixed at an induced strain of 1% by means of a standard test rig. The tensile test bar is injection moulded using a control polymer formulation containing no additional additives. The time taken for the appearance of fine crazes on the treated area of the test bar was recorded. The longer the time period prior to the appearance of the fine crazes, the less aggressive is the flame retardant to the polymer in respect of inducing stress cracking.

EXAMPLES

A standard control polycarbonate/ABS blend was made by extruding under standard conditions and temperatures a mix of 75% polycarbonate polymer, (Lexan 131 from GE Plastics) and 25% ABS polymer, (Magnum 213 from Dow Chemical Company). The resulting polymer blend was injection moulded using normal operating conditions into standard tensile test bars of 3.2 mm thickness. These test bars were used in the standard rig which puts a 1% strain on the test bars for the evaluation of the stress cracking aggressiveness of the various phosphorus compositions evaluated.

Example 1

A tertiary butyl phenyl phosphate mixture comprising of 39.5% tri (tertiary butylphenyl) phosphate, 42.7% di (tertiary butylphenyl) monophenyl phosphate, 15.8% mono (tertiary butylphenyl) diphenyl phosphate and 2.0% triphenyl phosphate was evaluated in the standard stress cracking resistance test rig and did not show any signs of crazing for 2 hours and 35 minutes.

Example 2

A tertiary butyl phenyl phosphate mixture comprising of 23.5% tri (tertiary butylphenyl) phosphate, 53.2% di (tertiary butylphenyl) monophenyl phosphate, 21.9% mono (tertiary butylphenyl) diphenyl phosphate and 1.4% triphenyl phosphate was evaluated in the standard stress cracking resistance test rig and did not show any signs of crazing for 2 hours and 55 minutes.

Example 3

A tertiary butyl phenyl phosphate mixture comprising of 29.3% tri (tertiary butylphenyl) phosphate, 45.3% di (tertiary butylphenyl) monophenyl phosphate, 15.9% mono (tertiary butylphenyl) diphenyl phosphate and 2.3% triphenyl phosphate was evaluated in the standard stress cracking resistance test rig and did not show any signs of crazing for 2 hours and 23 minutes.

Example 4

A tertiary butyl phenyl phosphate mixture comprising of 34.8% tri (tertiary butylphenyl) phosphate, 44.7% di (tertiary butylphenyl) monophenyl phosphate, 13.0% mono (tertiary butylphenyl) diphenyl phosphate and 1.4% triphenyl phosphate was evaluated in the standard stress cracking resistance test rig and did not show any signs of crazing for 3 hours.

COMPARATIVE EXAMPLES

Other commercially available phosphorus compounds were also evaluated under identical conditions and the results are listed in Table 1.

TABLE 1

| Commercial Name | Chemical Nature | Time to onset of crazing |
|---|---|---|
| Reofos 50 | isopropylated phenyl phosphate | 2 minutes |
| Reofos 350 | isopropylated phenyl phosphate | 21 minutes |
| Reofos RDP | oligomeric phosphate | 59 minutes |
| Phosflex 71B | butylated phosphate | 2.3 minutes |
| Kronitex B100 | butylated phosphate | 5.2 minutes |
| Kronitex B200 | butylated phosphate | 12.8 minutes |
| Reomol TOP | tri(ethylhexyl) phosphate | 0.1 minutes |
| Kronitex CDP | cresyl diphenyl phosphate | 1.5 minutes |
| Kronitex TXP | trixylyl phosphate | 9 minutes |
| Santicizer 141 | alykl diaryl phosphate | 0.2 minutes |
| Santicizer 2148 | alkyl diaryl phosphate | 0.25 minutes |

Example 5

A 50/50% w/w blend of the tertiary butylphenyl phosphate mixture defined in example 4 was made with Reofos RDP, a bis phosphate. This blended phosphate was evaluated as before in the standard stress crack resistance test rig and lasted for 2 hours and 5 minutes before any evidence of crazing was observed.

Example 6

The tertiary butylphenyl phosphate mixture defined in example 4 was mixed with triphenyl phosphate (TPP) at various mix concentrations and the resulting liquid was tested on the standard stress cracking resistance rig. The blends with triphenyl phosphate and the results of the stress crack evaluations are listed in table 2.

TABLE 2

| Blend composition (% w/w) | Time to onset of crazing |
|---|---|
| Phosphate defined in example 4 (92.5%)/TPP (7.5%) | 90 minutes |
| Phosphate defined in example 4 (95%)/TPP (5%) | 140 minutes |
| Phosphate defined in example 4 (97.5%)/TPP (2.5%) | 180 minutes |
| Phosphate defined in example 4 (99%)/TPP (1%) | 230 minutes |

In order to demonstrate the flame retardant ability of the said compositions a PC/ABS composition flame retarded with a tertiary butyl phenyl phosphate was compounded using standard techniques on a ZSK-30 extruder. The polymer and other minor additives were dry blended prior to feeding into the main feed port via a gravimetric feeder whilst the tertiary butyl phenyl phosphate was fed downstream using a calibrated liquid injection pump. The extruder barrel was set to a temperature of 240 to 260° C. for the compounding process. The polymer composition was the made into standard UL94 flammability test bars using a Battenfield 20-ton injection moulding and tested in accordance with the UL94 flammability test specification.

Example 7

The following polymer composition was compounded and tested for its flammability performance as described above and found to meet the UL-94-VO specification with a test bar thickness of both 1.6 mm and 3.2 mm. The tertiary butylphenyl phosphate mixture is as described in example 4, and the two specific grades of polycarbonate (PC) and acrylonitrile butadiene styrene (ABS) are both available from DOW Chemical Company.

|  | % w/w |
|---|---|
| PC (Calibre 201-10) | 65.2% |
| ABS (Magnum 9010 NT) | 16.3% |
| Tertiary butyl phenyl phosphate mixture | 18% |
| Teflon 6C (from Dupont) | 0.5% |

In order to assess the humid ageing performance of the tertiary butyl phenyl phosphate in comparison with other monophosphates and bisphosphates various additives were compounded into a polycarbonate resin, Lexan 141 from GE Plastics, at a 10% loading of additive using a Brabender compounder at a temperature of 270° C. The resulting compositions were then compression moulded in to a sheet 1.6 mm thick using a compression mould set at a temperature of 270° C. The resulting sheet was then cut into small strips approximately 0.5 cm in width and suspended in an atmosphere of steam for several days with samples of the polymer composition removed and analysed for the polymer molecular weight by Gel Permeation Chromatography. The molecular weight of the polycarbonate in the compositions was also determined prior to any humid ageing. All the compositions tested contained 90% w/w of Lexan 141 polycarbonate and 10% of the various phosphates.

Example 8

The phosphates listed in Table 3 were each evaluated using the above techniques for their effect on the molecular weight change of the polycarbonate when compounded in at a 10% level. The reduction in molecular weight of the polycarbonate over time is included in the table.

TABLE 3

|  | Polycarbonate molecular weight change | | |
|---|---|---|---|
| Phosphate | After 8 hours ageing | After 24 hours ageing | After 48 hours ageing |
| Tertiary butylphenyl phosphate mixture as in example 4 | −1,000 | −2,200 | −4,900 |
| Reofos TPP | −1,300 | −4,400 | −9,800 |
| Reofos RDP | −4,700 | −14,800 | −29,000 |

The tertiary butylphenyl phosphate mixture as described in example 4 has the additional benefit of giving good resistance to humid ageing on polycarbonate and other polymer compositions.

What is claimed is:

1. A polymeric composition comprising at least one engineering polymer and at least one phosphate ester flame retardant additive wherein:

the phosphate ester flame retardant additive is a mixed tri (tertiary butylphenyl) phosphate ester which comprises from 1 to 45% by weight of tri (tertiary butylphenyl) phosphate; from 10 to 55% by weight of di (tertiary butylphenyl) monophenyl phosphate; from 10 to 60% by weight of mono (tertiary butylphenyl) diphenyl phosphate; and less than 10% by weight of triphenyl phosphate; and the mixed phosphate ester comprises from 1 to 35 parts by weight based on 100 parts by weight of the polymer.

2. A composition according to claim 1 characterised in that said mixed phosphate comprises from 25 to 40% of tri (tertiary butylphenyl) phosphate; from 30 to 55% by weight of di (tertiary butylphenyl) monophenyl phosphate; from 10% to 25% by weight of mono (tertiary butylphenyl) diphenyl phosphate and less than 5% by weight of triphenyl phosphate.

3. A composition according to claim 1 characterised in that the mixed tri (tertiary butylphenyl) phosphate ester comprises less than 2% by weight of triphenyl phosphate.

4. A composition according to claim 1 characterised in that the composition comprises less than 2% by weight of triphenyl phosphate.

5. A composition according to claim 1 in that it comprises from 5 to 20 parts by weight of the mixed tertiary butylphenyl phosphate ester.

6. A composition according to claim 1 characterised in that it further comprises an oligomeric phosphate having the formula:

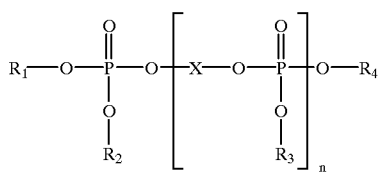

wherein:
the groups $R_1$, $R_2$, $R_3$, and $R_4$ which may be the same or different represent aryl groups, halo-substituted aryl groups or alkyl substituted aryl groups wherein the alkyl substituent comprises from 2 to 6 carbon atoms;

X represents an arylene group and n is an integer having an average value of from 1 to 5; and the oligomeric phosphate is present in a which is from 1% to 50% w/w of the weight of the mixed tertiary butylphenyl phosphate ester.

7. A composition according to claim 6 characterised in that X represents a phenylene group.

8. A composition according to claim 6 characterised in that X represents a 2,2 diphenyl propane group.

9. A composition according to claim 1 characterized in that it comprises from 1 to 10% w/w of a monophosphate.

10. A composition according to claim 1 characterized in that the polymer is polycarbonate.

11. A composition according to claim 10 characterised in that the polymer is a blend of a polycarbonate with a styrenic polymer.

12. A composition according to claim 11 characterised in that styrenic polymer is an ABS polymer.

13. A composition according to claim 11 characterised in that the styrenic polymer is a styrene/acrylonitrile polymer.

14. A composition according to claim 11 characterised in that the styrenic polymer is a styrene/maleic anhydride polymer.

15. A composition according to claim 11 characterised in that the polycarbonate is with a graft copolymer derived from a styrenic polymer and a rubber.

16. A composition according to claim 1 characterised in that the polymer is a blend of polyphenylene oxide.

17. A composition according to claim 16 characterised in that the polymer is a blend of a poly(phenylene oxide) with a high impact polystyrene.

18. A composition according to claim 1 characterised in that the engineering polymer is selected from polycarbonate, polyphenylene oxide, a blend of polycarbonate with a styrenic polymer, and a blend of polyphenylene oxide with a styrenic polymer.

19. A composition according to claim 18 characterized in that said mixed phosphate comprises from 25 to 40% by weight of tri (tertiary butylphenyl) phosphate; from 30 to 55% by weight of di (tertiary butylphenyl) monophenyl phosphate; from 10 to 25% by weight of mono (tertiary butylphenyl) diphenyl phosphate; and less than 5% by weight of triphenyl phosphate.

20. A composition according to claim 18 characterized in that the mixed tri (tertiary butylphenyl) phosphate ester comprises less than 2% by weight of triphenyl phosphate.

21. A composition according to claim 18 characterised in that the composition comprises less than 2% by weight of triphenyl phosphate.

22. A composition according to claim 18 in that it comprises from 5 to 20 parts by weight of the mixed tertiary butylphenyl phosphate ester.

23. A composition according to claim 18 characterised in that it further comprises an oligomeric phosphate having the formula:

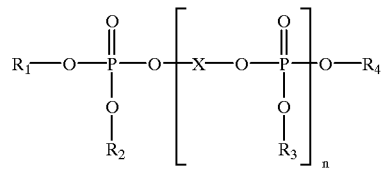

wherein:

the groups $R_1$, $R_2$, $R_3$, and $R_4$ which may be the same or different represent aryl groups, halo-substituted aryl groups or alkyl substituted aryl groups wherein the alkyl substituent comprises from 2 to 6 carbon atoms; X represents an arylene group and n is an integer having an average value of from 1 to 5; and the oligomeric phosphate is present in a which is from 1% to 50% w/w of the weight of the mixed tertiary butylphenyl phosphate ester.

24. A composition according to claim 18 characterized in that it comprises from 1 to 10% w/w of a monophosphate (other than already present in the tertiary butylphenyl phosphate mixture).

25. A polymeric composition comprising at least one engineering polymer and at least one phosphate ester flame retardant additive wherein:

the phosphate ester flame retardant additive is a mixed tri (tertiary butylphenyl) phosphate ester which comprises from 1 to 45% by weight of tri (tertiary butylphenyl) phosphate; from 10 to 55% by weight of di (tertiary butylphenyl) monophenyl phosphate; from 10 to 60% by weight of mono (tertiary butylphenyl) diphenyl phosphate; and less than 10% by weight of triphenyl phosphate; and the engineering polymer is selected from polycarbonate, polyphenylene oxide, a blend of polycarbonate with a styrenic polymer, and a blend of polyphenylene oxide with a styrenic polymer.

* * * * *